(12) United States Patent
Costantini et al.

(10) Patent No.: US 7,895,776 B2
(45) Date of Patent: Mar. 1, 2011

(54) EAR TAG FOR IDENTIFICATION OF AN ANIMAL, COMPRISING A DEFORMABLE ELEMENT FOR ACCOMODATING A PIN

(75) Inventors: Anne Costantini, La Guerche de Bretagne (FR); Jean-Jacques Hilpert, Vitré (FR)

(73) Assignee: Allflex Europe SAS, Vitre (FR)

( * ) Notice: Subject to any disclaimer, the term of this patent is extended or adjusted under 35 U.S.C. 154(b) by 0 days.

(21) Appl. No.: 12/089,714

(22) PCT Filed: Oct. 11, 2006

(86) PCT No.: PCT/EP2006/067264
§ 371 (c)(1),
(2), (4) Date: May 30, 2008

(87) PCT Pub. No.: WO2007/042528
PCT Pub. Date: Apr. 19, 2007

(65) Prior Publication Data
US 2008/0250682 A1    Oct. 16, 2008

(30) Foreign Application Priority Data
Oct. 13, 2005   (FR) ...................... 05 10448

(51) Int. Cl.
*G09F 3/00*    (2006.01)
(52) U.S. Cl. ............................ 40/301; 40/668
(58) Field of Classification Search ............ 40/301, 40/668; 119/655
See application file for complete search history.

(56) References Cited

U.S. PATENT DOCUMENTS

| | | | | |
|---|---|---|---|---|
| 1,390,342 | A * | 9/1921 | Delay | 40/301 |
| 4,958,452 | A * | 9/1990 | Tate | 40/301 |
| 5,768,813 | A * | 6/1998 | Reboul et al. | 40/301 |
| 6,021,592 | A | 2/2000 | Caisley et al. | |
| 6,385,877 | B1 * | 5/2002 | Wikan | 40/301 |
| 6,501,430 | B1 * | 12/2002 | Esselink | 343/718 |
| 6,666,170 | B1 | 12/2003 | Hilpert | |
| 6,708,432 | B2 * | 3/2004 | Haar et al. | 40/301 |
| 2003/0000119 | A1 | 1/2003 | Savy | |
| 2006/0117619 | A1 | 6/2006 | Costantini | |
| 2008/0047177 | A1 * | 2/2008 | Hilpert | 40/301 |

FOREIGN PATENT DOCUMENTS

| | | |
|---|---|---|
| AU | 568 399 B2 | 12/1987 |
| FR | 2 845 564 A | 4/2004 |
| WO | 2006/021855 A2 | 3/2006 |

* cited by examiner

*Primary Examiner* — Joanne Silbermann
*Assistant Examiner* — Kristina Staley
(74) *Attorney, Agent, or Firm* — Young & Thompson

(57) ABSTRACT

In a tag for identifying and marking animals, the tag associates a receiver button (1) by irreversible fitting of a finger (2). The button (1) includes a head (13) wherein is provided a cavity (8) for receiving a punch (3) of the finger (2). The head (13) is secured to a shell (5) retaining the punch (3) which is provided with an opening (6) for introducing the punch (3) inside the button (1). The axial wall (7) of the retaining shell (5) delimiting the opening (6) is radially deformable. A chamber (11) is arranged between the head (13) and the axial wall (7) for receiving the latter (7) deformed under the effect of the punch (3) passing through the opening (6).

20 Claims, 2 Drawing Sheets

EAR TAG FOR IDENTIFICATION OF AN ANIMAL, COMPRISING A DEFORMABLE ELEMENT FOR ACCOMODATING A PIN

TECHNICAL FIELD OF THE INVENTION

This invention belongs to the field of tagging and identification of animals, and more particularly ear tags for livestock. It has as its object such an ear tag that comprises an element, such as a button or the like, for accommodating a pin by irreversible interlocking for the installation of the tag on the animal.

PRIOR ART

The ear tags for the identification and the tagging of animals are designed to make it possible to track animals from birth until slaughter. Such tags currently combine a receiving button by irreversible interlocking of a pin. A plate of the pin and the button are designed to be placed on both sides of the ear of an animal. The pin is equipped with a punch that passes through the ear to be housed in a cavity that is located in the button. Such tags carry small tagged plates that identify the animal. Secondarily, these tags are also likely to be equipped with electronic means of identification, such as a transponder or the like, housed inside the button.

The button is more particularly equipped with a head inside of which is located the cavity that is designed to accommodate the punch of the pin. This head is carried by a first shell with which it forms a single piece, which is produced by welding, by casting, or the like, on a second shell that is provided by the punch passing toward the cavity. Elastic deformation means are inserted between the button and the pin to allow the insertion of the punch inside the button and then to protect it from being withdrawn. For example, these means consist of a radially deformable arrangement of the pin and the cavity that accommodates it. Furthermore, the pin comprises a shoulder for support against an opposing shoulder of the second shell. Also for example, these means consist of a radially deformable spring-type elastic element that is inserted inside the button, whereby this deformable element allows the passage of the punch and then protects it from being withdrawn by an axial stop. It will be possible, for example, to refer to the document FR2845564 (ALLFLEX EUROPE) that describes such an ear button.

One problem that arises is that it is hard for the punch to pass through the inside of the button during the installation of the pin, despite the deformability of the elastic means. The difficulty of this passage results from the irreversible nature of the interlocking of the pin in the button, which it is necessary to achieve to ensure an inviolability of the identification of the animal. Finally, the result is an installation of the tag on the animal that proves difficult and delicate to accomplish. Moreover, the ear tags are able to be placed in an environment at low ambient temperature, with the consequence of altering the ability of the elastic means to deform. Furthermore, ear tags whose structure is the simplest possible and whose production is easy in order to reduce the production costs thereof and to make them competitive are sought. Nevertheless, this structural simplification should not interfere with the quality of the irreversible connection between the pin and the button.

OBJECT OF THE INVENTION

The object of this invention is to propose an ear tag—for the identification and the tagging of animals—of the type that comprises a receiving button by irreversible interlocking of a pin, whose installation on the animal is easy and fast, without interfering with the quality and the reliability of the irreversible connection between the pin and the button. This invention also aims at proposing such an ear tag whose structure is simple and whose production is easy.

The ear tag of this invention is designed for the identification and the tagging of animals. This tag primarily combines a receiving button by irreversible interlocking of a pin. This button comprises a head inside of which is located a cavity for axial accommodation of the terminal end of the pin, in particular arranged as a punch. This head is secured to a shell for holding the punch, whereby the shell has an opening for inserting the punch inside the button toward the cavity and a shoulder to keep the punch from being extracted from the button, by having a shoulder that the punch comprises stop against the holding shoulder. The tag comprises elastic radial deformation means for allowing the passage of the punch through the opening, during its insertion inside the button. Button will be understood as any female element that can accommodate the pin, whereby this element is in particular designed as a recessed body. The button is able to be equipped, as an insert or as an integral part, with an extension that forms an identification plate for the animal.

According to this invention, such a tag is primarily recognizable in that the axial wall of the holding shell that delimits said opening is radially deformable. These arrangements are such that said elastic radial deformation means that equip the tag of the invention consist of the ability of said axial wall to deform radially. To facilitate the introduction of the punch inside the button, and more particularly its passage through the opening of the holding shell, at least one chamber is located between the head and said axial wall. This chamber constitutes a reserve for accommodating the axial wall of the holding shell when it is deformed under the action of the passage of the punch through said opening. The return to the initial position of the axial wall of the holding shell protects the punch from being withdrawn beyond the button, by stopping the latter against the end face of said axial wall, which forms in particular said holding shoulder against which the shoulder of the punch rests.

The head is preferably made from a hard material in order to be resistant and undeformable. This material is in particular a plastic material, such as polyamide or the like.

The chamber is preferably radially subdivided into a number of basic chambers, in particular separated from one another by radial partitions that can also constitute, and advantageously, elements for centering the head on the holding shell.

According to a preferred embodiment, the head is made secured to the holding shell by means of a connecting shell that is secured to both the holding shell and the head.

More particularly, the button consists of three elements, namely the head, the holding shell, and the connecting shell. To make possible the easy formation of the chamber despite its containment between the head and the holding shell, it is proposed to produce these elements separately by reserving a space between their respective axial wall that is designed to form the chamber, then to connect them to one another by means of the connecting shell. The latter is inserted in particular by molding jointly on the head and on the holding shell.

Preferably, the head comprises a full peripheral wall that is inserted between the connecting shell and said chamber, to keep the latter from an intrusion of the constituent material of the connecting shell during the molding operation of the latter. It will be noted that the possible containment of the chamber results in particular from the presence of the peripheral wall that the head comprises.

The holding shell preferably comprises elements for centering the head, for the positioning of the latter during the molding operation of the connecting shell. These centering elements consist of, for example, lugs that are located on the outside periphery of said axial wall of the holding shell. As is the object above, these lugs form in particular crosspieces for positioning the head relative to the axial wall of the holding shell, whereby these crosspieces make it possible to locate said chamber and form separating partitions between said basic chambers.

The chamber is located in particular between the full peripheral wall of the head and said axial wall of the holding shell.

According to various variant embodiments that allow the elastic deformation of the axial wall of the holding shell, either the latter is continuous, whereby its constituent material is an elastically deformable plastic material such as polyurethane, or the axial wall of the holding shell is intermittent, in that it consists of, in particular, radially deformable flanges.

According to a preferred embodiment, the holding shell is formed by a flexible cohesive mass, whose overall deformability, on the one hand, makes possible the radial deformation of said axial wall, and, on the other hand, enhances the protection of the pin against being withdrawn by axial deformation of the axial wall. It turns out that the deformation of the female element for accommodating the pin is promoted during the insertion of the latter inside the cavity that the button comprises for this purpose.

Secondarily, the tag is equipped with electronic identification means, such as a transponder or the like, which are housed in particular in the button.

DESCRIPTION OF THE FIGURES

This invention will be better understood and details relevant thereto will emerge from reading the description that will be provided of a preferred embodiment in relation to the figures of the attached sheets, in which:

In FIG. 1 to FIG. 3, an ear tag is designed for the identification and the tagging of an animal, starting from its installation on an ear of the latter. This tag combines a button 1 and a pin 2 that are designed to be assembled with one another by irreversible interlocking. At one of its ends, the pin 2 comprises a punch 3, and at the other of its ends, a plate 4 that is designed to rest against a face of the ear of the animal. Preferably, the pin 2 is made by molding a more or less flexible plastic material. According to a variant embodiment of the pin 2, the latter is able to be formed from a hard plastic material, such as a polyamide or the like. The button 1 is designed to be placed on the other face of the ear of the animal, by resting against the latter by means of the base of a holding shell 5 of the punch 3 inside the button 1. It will be noted that according to a variant embodiment that is not shown, this button 1 is able to comprise a plate that offers a tagging surface for the identification of the animal.

Figure 1:
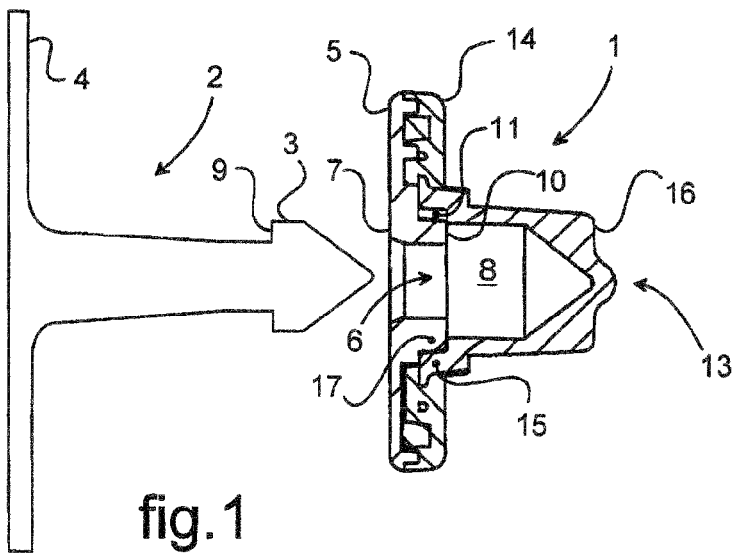
FIG. 1 to FIG. 3 are diagrammatic cutaway views of an ear tag according to the invention that illustrate successively the primary assembly stages of a pin with a button that this tag comprises.
Figure 2:
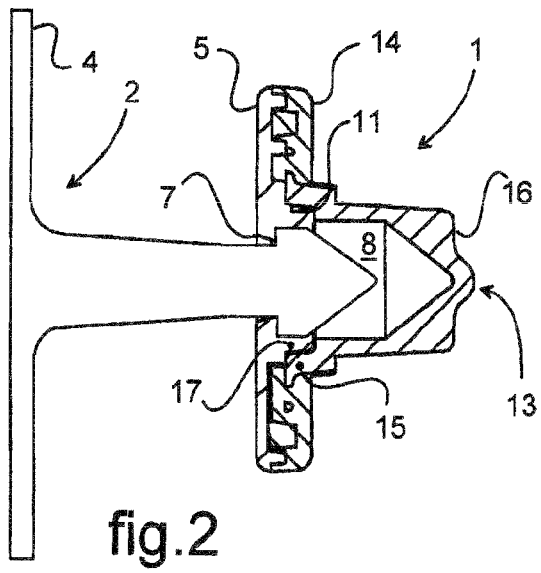
Figure 3:
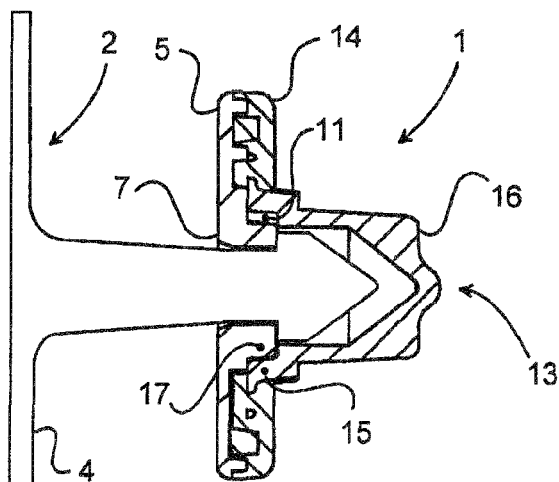

During the installation of the ear tag on the animal by an operator, the button 1 and the pin 2 are respectively placed on both sides of the ear of the animal, as illustrated in FIG. 1. The punch 3 passes through the ear of the animal, then penetrates through an opening 6 located in the holding shell 5, as illustrated in FIG. 2. To facilitate the insertion of the punch 3 through the opening 6, the latter is designed as a cone. The opening 6 is delimited by an axial wall 7 of the holding shell 5, which forms a passage toward a cavity 8 for accommodating the punch 3. When the installation of the tag is carried out, the punch 3 is housed in the cavity 8 of the button 1, as illustrated in FIG. 3. To protect the punch 3 from being withdrawn outside of the cavity 8, the latter 3 comprises a shoulder 9 for an axial stop against a holding shoulder 10 that the holding shell 5 comprises.

The holding shell 5 is made from a flexible plastic material, such as a polyurethane or the like, to be deformable. These arrangements aim at allowing an enlargement of the opening 6 starting from a radial deformation of the axial wall 7, under the action of the passage of the punch 3 through the holding shell 5 during the insertion of the pin 2. To facilitate this deformation, the button 1 comprises a chamber 11 for accommodating the axial wall 7 that is deformed under the action of the passage of the punch 3 through the opening 6. This chamber 11 is next to the axial wall 7 and extends in a circle around this wall 7. Preferably, this chamber 11 is radially subdivided into a number of cylindrical segments that form respective basic chambers. After the punch 3 is inserted into the cavity 8, the axial wall 7 regains its initial natural conformation.

The button 1 is formed by assembling the holding shell 5 and a head 13 by means of a connecting shell 14. The head 13 comprises a full peripheral wall 15 that is encased at its base by the connecting shell 14. The peripheral wall 15 is surmounted by a cap 16 that houses the cavity 8 for accommodating the punch 3. To effectively contain the rigid punch 3, the head 13 is preferably made from a hard material, such as a metal material or a hard plastic material, such as a polyamide or the like. The connecting shell 14 is preferably made from a deformable flexible plastic material, such as a polyurethane. The connecting shell 14 is inserted by molding on the holding shell 5 and on the full peripheral wall 15 of the head 13 by locating a space between them that is designed to constitute the chamber 11 for accommodating the axial wall 7. The peripheral wall 15 constitutes an obstacle to the intrusion of the constituent material of the connecting shell 14 as it is being fed in by molding.

Figure 4:
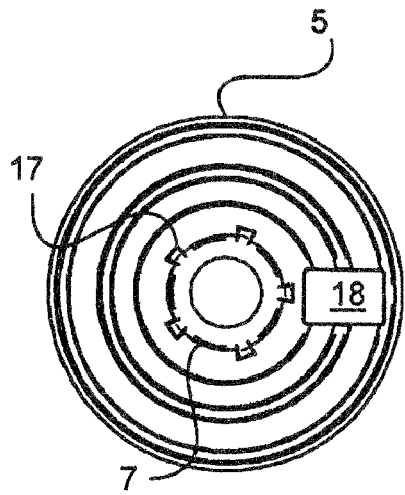
FIG. 4 and FIG. 5 are diagrammatic top and perspective views, respectively, of a lower working shell of the button illustrated in the preceding figures.
Figure 5:
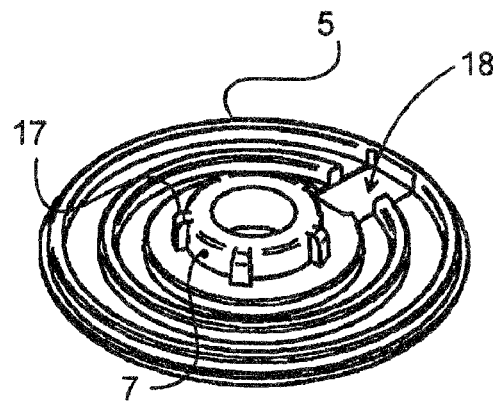
Figure 6:
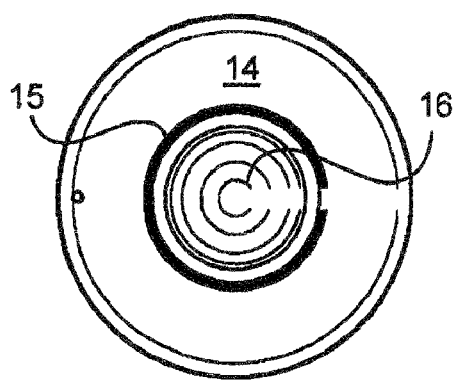
FIG. 6 and FIG. 7 are diagrammatic top and perspective views, respectively, of a button illustrated in FIG. 1 to FIG. 3.
Figure 7:
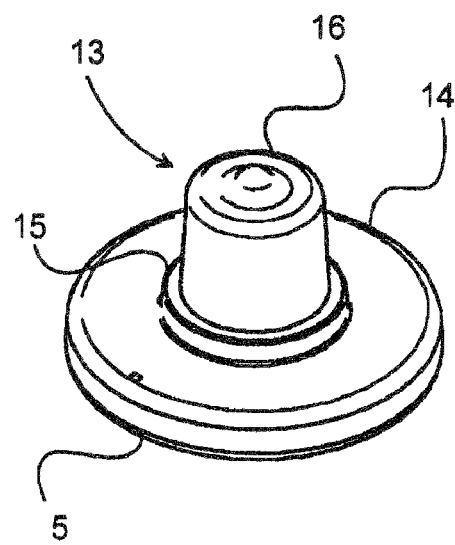

In FIG. 4 and FIG. 5, the outside face of the axial wall 7 is equipped with lugs 17 for centering the head 13, against which lugs 17 the peripheral wall 15 of this head 13 rests. These lugs 17 constitute crosspieces between the axial wall 7 and the peripheral wall 15 to locate between them the radial basic chambers that compose the chamber 11.

The holding shell 5 comprises a recess 18 that is designed to accommodate an electronic means for identification of the animal, such as a transponder or the like.

The invention claimed is:

1. An ear tag for the identification and the tagging of animals:
    wherein this tag primarily combines a receiving button (1) by irreversible interlocking of a pin (2);
    wherein this button (1) comprises a rigid head (13) inside of which is located a cavity (8) for axial accommodation of a punch (3) of the pin (2), the head (13) being formed of a hard first material;
    wherein this head (13) is secured to a holding shell (5) only via a connecting shell (14) that is secured to both the holding shell (5) and the head (13) for holding the punch (3), which is equipped with an opening (6) for inserting the punch (3) inside the button (1) toward the cavity (8), and a shoulder (10) for holding the punch (3) against the withdrawal of the punch (3) outside of the button (1), by stopping a shoulder (9) that the punch (3) comprises against the holding shoulder (10), the holding shell (5) being made of a flexible second material, the first material and the second material being formed from different materials, the first material being harder than the second material relative to each other;

wherein an axial wall (7), of the holding shell (5) that delimits said opening (6) is formed of an elastic material and is radially deformable to allow passage of the punch (3) through the opening (6); and wherein at least one chamber (11) is located between the head (13) and said axial wall (7) for the accommodation of the axial wall (7) that is deformed under the action of the passage of the punch (3) through said opening (6).

2. The ear tag according to claim 1, wherein the chamber (11) is radially subdivided into a number of basic chambers.

3. The ear tag according to claim 2, wherein the holding shell (5) comprises elements (17) for centering the head (13), and wherein the basic chambers are separated from one another by radial partitions that also constitute said centering elements (17).

4. The ear tag according to claim 3, wherein said centering elements (17) consist of lugs located on the outside periphery of said axial wall (7) of the holding shell (5), which constitute crosspieces between the axial wall (7) and the peripheral wall (15), locating said chamber (11) between them.

5. The ear tag according to claim 2, wherein said axial wall (7) of the holding shell (5) is continuous, and its constituent material is an elastically deformable plastic material.

6. The ear tag according to claim 1, wherein the connecting shell (14) is inserted by molding jointly on the head (13) and on the holding shell (5).

7. The ear tag according to claim 6, wherein the head (13) comprises a full peripheral wall (15) that is inserted between the connecting shell (14) and said chamber (11) to protect the chamber (11) against intrusion of the constituent material of the connecting shell (14) during the molding operation of the connecting shell (14).

8. The ear tag according to claim 7, wherein the chamber (11) is located between the full peripheral wall (15) of the head (13) and said axial wall (7) of the holding shell (5).

9. The ear tag according to claim 7, wherein the holding shell (5) comprises elements (17) for centering the head (13).

10. The ear tag according to claim 7, wherein said axial wall (7) of the holding shell (5) is continuous, and its constituent material is an elastically deformable plastic material.

11. The ear tag according to claim 6, wherein the holding shell (5) comprises elements (17) for centering the head (13).

12. The ear tag according to claim 11, wherein said centering elements (17) consist of lugs located on the outside periphery of said axial wall (7) of the holding shell (5), which constitute crosspieces between the axial wall (7) and the peripheral wall (15), locating said chamber (11) between them.

13. The ear tag according to claim 11, wherein said axial wall (7) of the holding shell (5) is continuous, and its constituent material is an elastically deformable plastic material.

14. The ear tag according to claim 6, wherein said axial wall (7) of the holding shell (5) is continuous, and its constituent material is an elastically deformable plastic material.

15. The ear tag according to claim 1, wherein said axial wall (7) of the holding shell (5) is continuous, and its constituent material is an elastically deformable plastic material.

16. The ear tags according to claim 1, wherein it is equipped with electronic identification means.

17. The ear tag according to claim 1, wherein said axial wall (7) of the holding shell (5) is continuous, and its constituent material is an elastically deformable plastic material.

18. The ear tag according to claim 1, wherein a top surface of the axial wall is adjacent to a bottom surface of the holding shell.

19. The ear tag according to claim 1, wherein the first material is metal, a hard plastic material or polyamide.

20. The ear tag according to claim 1, wherein the second material is a flexible plastic material or polyurethane.

* * * * *